United States Patent

Yamamoto

[11] Patent Number: 5,499,173
[45] Date of Patent: Mar. 12, 1996

[54] HEAD LAMP DEVICE FOR MOTOR VEHICLE

[75] Inventor: Takao Yamamoto, Saitama, Japan

[73] Assignee: Honda Giken Kogyo Kabushiki Kaisha, Tokyo, Japan

[21] Appl. No.: 313,588

[22] Filed: Sep. 29, 1994

[30] Foreign Application Priority Data

Sep. 30, 1993 [JP] Japan .................................. 5-245729

[51] Int. Cl.⁶ .................................................. F21V 29/00
[52] U.S. Cl. .............................. 362/294; 362/66; 362/72; 362/373
[58] Field of Search .................................. 362/66, 72, 80, 362/273, 284, 289, 294, 297, 345, 373, 428

[56] References Cited

U.S. PATENT DOCUMENTS

| 4,539,627 | 9/1985 | Ogishima | 362/72 |
| 4,862,337 | 8/1989 | Ohshio et al. | 362/80 |
| 5,010,453 | 4/1991 | Ketterman | 362/294 |
| 5,079,676 | 1/1992 | Lisak | 362/66 |
| 5,207,497 | 5/1993 | Kamishina et al. | 362/294 |

FOREIGN PATENT DOCUMENTS

| 0330884 | 2/1989 | European Pat. Off. . |
| 3527789 | 2/1985 | Germany . |
| 585435 | 1/1991 | Japan . |
| 4-135105 | 6/1991 | Japan . |

Primary Examiner—Ira S. Lazarus
Assistant Examiner—Y. Quach
Attorney, Agent, or Firm—Birch, Stewart, Kolasch & Birch

[57] ABSTRACT

First adjustment screws for adjusting the optical axis are disposed near vent pipes of a head lamp device for a motor vehicle, and guard ribs which separate the first adjustment screws and the vent pipes from each other project from a housing. While the head lamp is being aimed, the vent pipes are prevented from being damaged or dismounted in error by a screwdriver. As a result, adjustment screws may be very short even though they are close to the vent pipes, allowing the space behind the head lamp device to be utilized effectively.

21 Claims, 9 Drawing Sheets

HEAD LAMP DEVICE FOR MOTOR VEHICLE

BACKGROUND OF THE INVENTION

1. Field of the Invention

The present invention relates to a head lamp device for a motor vehicle.

2. Description of Background Art

A two-bulb head lamp device for a motor vehicle is set forth in the present inventor's co-pending Japanese Laid-open Patent Publication No. 5-85435. The proposed head lamp device comprises two bulbs and a pair of reflecting mirrors which are accommodated in one housing. Water vapor in the housing is evaporated by the heat of the bulbs and tends to be attached to the inner surface of a lens, thereby frosting the lens. Head lamp devices designed to solve this problem have an opening defined in the housing for discharging heat and water vapor out of the housing.

Figure 3:
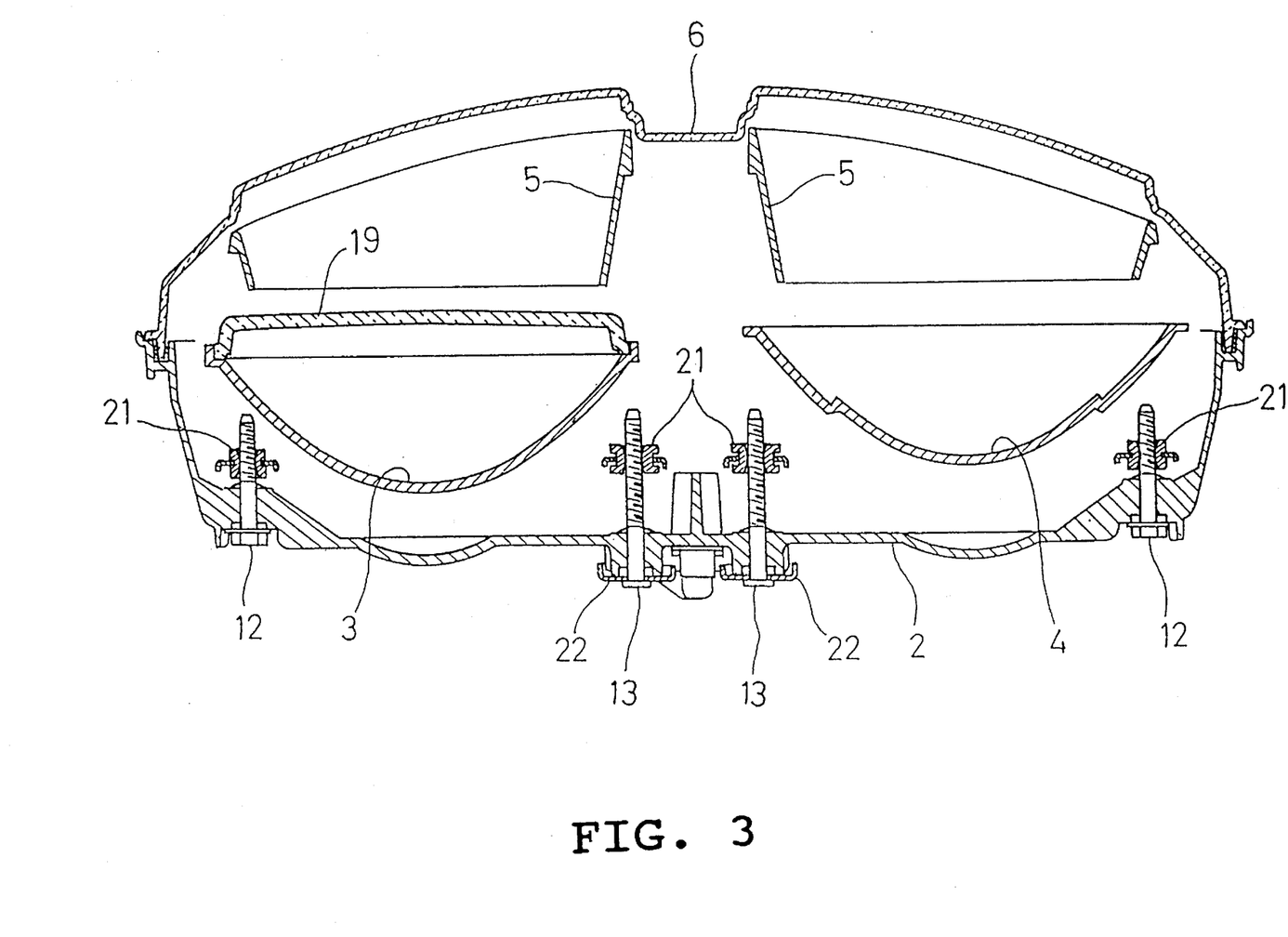
FIG. 3 is a cross-sectional view taken along line 3—3 of FIG. 2.

A head lamp device for a motor vehicle as disclosed in FIG. 3 of Japanese Laid-open Utility Model Publication No. 4-135105 has a J-shaped vent pipe (460) disposed on the back of a housing for discharging heat or the like. The optical axis can be adjusted vertically by rotating an optical axis adjusting mechanism 5A shown in FIG. 3. Generally, head lamp devices have an optical axis adjusting mechanism. An optical axis adjustment will hereinafter be referred to as "aiming" and an optical axis adjusting mechanism as the "aiming mechanism."

An aiming rod or aiming bolt, corresponding to the component 50A in FIG. 3 of Japanese Laid-open Utility Model Publication No. 4-135105, is considerably long. If the aiming rod was short, then a tool for turning the aiming rod would interfere with the J-shaped vent pipe, and would damage or dismount the J-shaped vent pipe when operated in error. Therefore, the aiming rod is of a sufficient length. The long aiming rod, however, requires a space behind the head lamp, and such a space is not preferable from the standpoint of positioning devices in a compact arrangement.

SUMMARY AND OBJECTS OF THE INVENTION

It is an object of the present invention to provide a technical arrangement for shortening the aiming rod of a head lamp device.

To achieve the above object, a head lamp device for a motor vehicle according to the present invention has an aiming mechanism for adjusting the optical axis disposed near a vent pipe, and a guard rib projecting from a housing and separating the aiming mechanism and the vent pipe from each other.

The reflector has a plurality of reflector surfaces having a plurality of types of reflecting angles, and a lens, disposed in front of the reflector, is substantially transparent.

The guard rib has a height which is substantially the same as the height at which the vent pipe is attached.

When a tool such as a screwdriver is disengaged from the aiming mechanism during an aiming process, the tool hits the guard rib, and does not reach the vent pipe.

In the case where the reflector has a plurality of types of reflector surfaces, the lens for use with the reflector may be substantially transparent. The substantially transparent lens has a good appearance and does not need any lens cuts. On the other hand, if water is applied to the inner surface of the lens, then it is frosted much more than a conventional lens with lens cuts. The lens is prevented from being frosted by ventilating the housing with the vent hole and the vent pipe.

In the case where the height of the guard rib is substantially the same as the height at which the vent pipe is attached, a tool such as a screwdriver used for aiming is less liable to hit the vent pipe.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENT OF THE INVENTION

An embodiment of the present invention will hereinafter be described with reference to the accompanying drawings.

Figure 1:
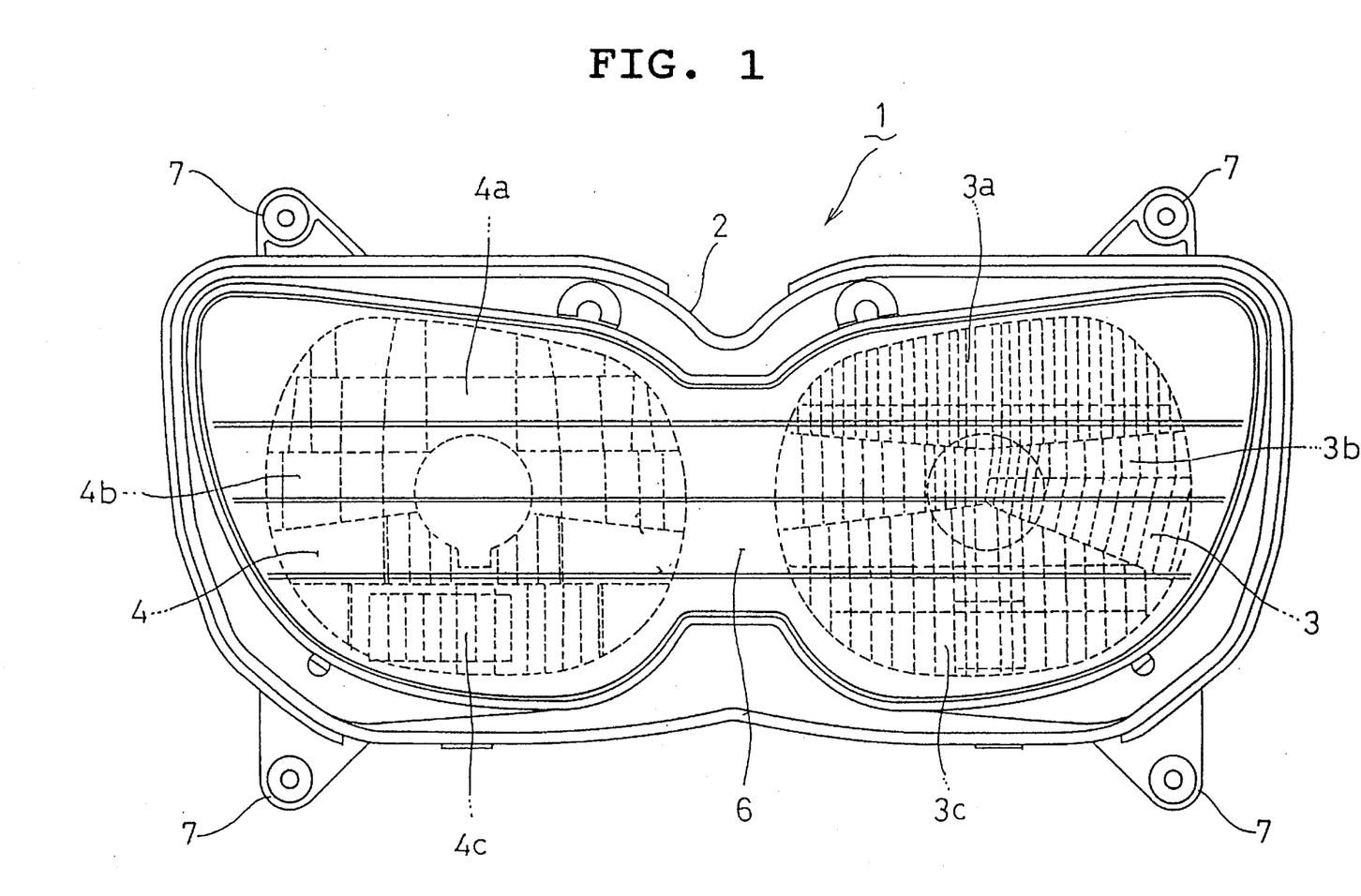
FIG. 1 is a front elevational view of a head lamp device according to the present invention.

FIG. 1 is a front elevational view of a head lamp device according to the present invention. The head lamp device 1 has a first reflector 3, a second reflector 4, and intermediate tubes 5, see FIG. 3 which are accommodated in a housing 2, and a lens 6 fitted over the housing 2. The head lamp device 1 is mounted on a vehicle body by screws (not shown) extending through respective attachment arms 7 threadedly into the vehicle body.

The first reflector 3 has a plurality of reflector surfaces 3a, 3b, 3c, having a plurality of types of reflecting angles, so that the first reflector 3 has Fresnel surface irregularities on its reflecting surface. The reflector surfaces 3a, 3b, 3c, of the reflector 3 are effective to distribute light, and the lens 6 is not required to have lens cuts. Since the lens 6 does not need any lens cuts, the lens 6 has an improved appearance.

The second reflector 4 also has a plurality of reflector surfaces 4a, 4b, 4c, having a plurality of types of reflecting angles. However, the second reflector 4 has rougher Fresnel surface irregularities than the first reflector 3. The lens 6 is made of a transparent material.

Figure 2:
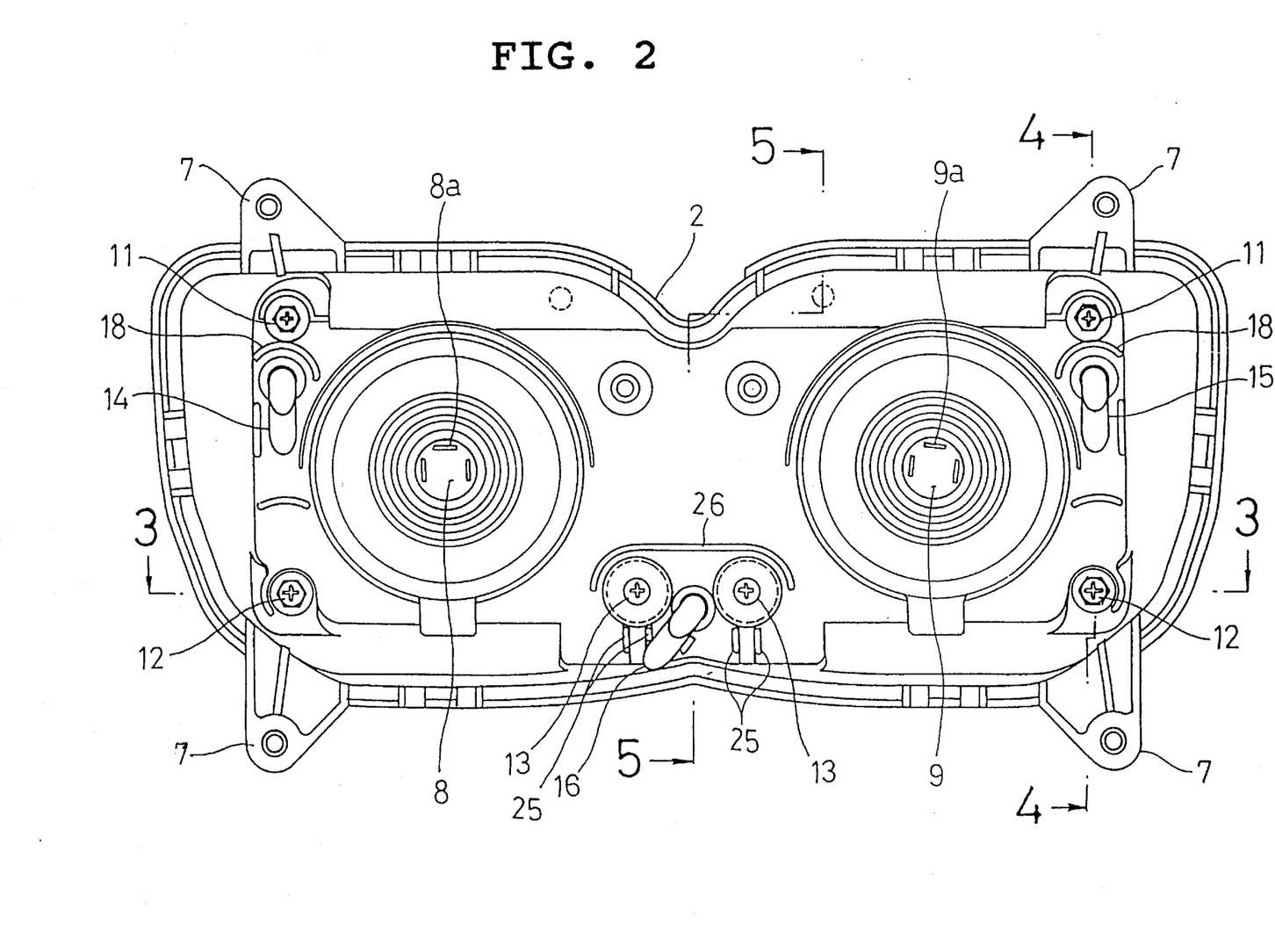
FIG. 2 is a rear elevational view of the head lamp device according to the present invention.

FIG. 2 is a rear elevational view of the head lamp device according to the present invention. The head lamp device has a terminal 8a of a first bulb 8, a terminal 9a of a second bulb 9, first through third adjustment screws 11, 12, 13 of an aiming mechanism are provided, and left and right vent pipes 14, 15 and a central vent pipe 16 which are mounted on the back of the housing 2. In addition, arcuate guard ribs 18 project rearwardly from the housing 2 above the respective left and right vent pipes 14, 15.

FIG. 3 is a cross-sectional view taken along line 3—3 of FIG. 2. The intermediate tubes 5 are disposed in front of the first and second reflectors 3, 4 in the housing 2. An inner lens 19 is mounted directly on the first reflector 3.

Nut-like sliders 21 are attached to the second and third adjustment screws 12, 13, and the first and second reflectors 3, 4 are attached to the sliders 21. In FIG. 3, the sliders 21 are shown as being separate from the reflectors 3, 4 because of the position of the section, but they are actually mechanically coupled to each other. See FIG. 4.

Therefore, when the second and third adjustment screws 12, 13 are turned, the sliders 21 are moved in the longitudinal direction thereof, thus varying the angle of attachment of the reflectors 3, 4 in the left and right directions. Crown gears 22 are mounted on the proximal ends of the third adjustment screws 13, respectively, so that the third adjustment screws 13 can be turned by the crown gears 22.

Figure 4:
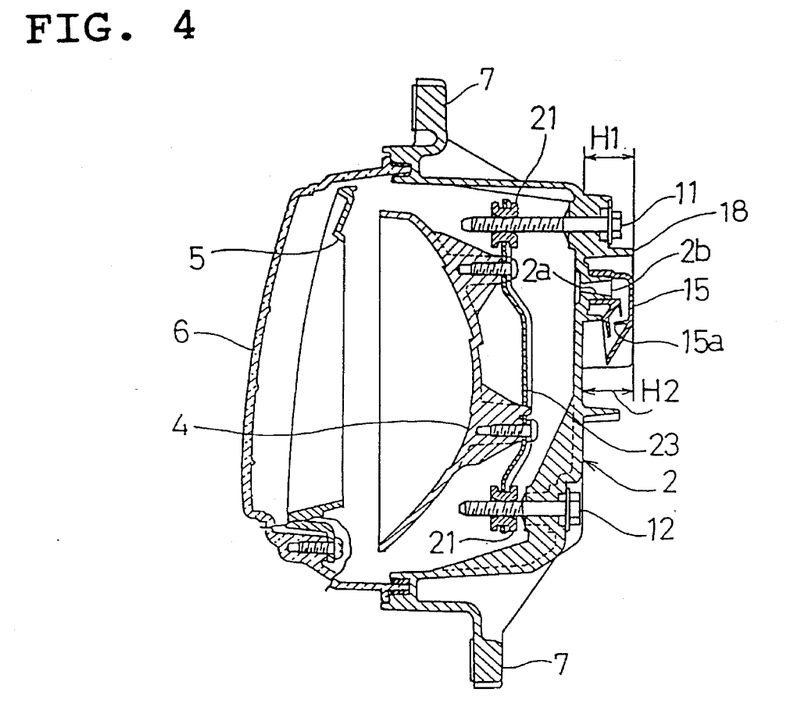
FIG. 4 is a cross-sectional view taken along line 4—4 of FIG. 2.

FIG. 4 is a cross-sectional view taken along line 4—4 of FIG. 2. The right vent pipe 15 comprises a substantially L-shape rubber tube having labyrinth projections 15a therein. The right vent pipe 15 is fitted over and resiliently attached to a boss 2b which surrounds a vent hole 2a defined in the back of the housing 2. The right vent pipe 15 has an opening positioned on its lower end. Therefore, water or the like is prevented from entering the right vent pipe 15 from above or laterally. Water from below is effectively blocked by the labyrinth projections 15a.

If the guard ribs 18 which are positioned above the right vent pipe 15 and below the first adjustment screws 11 projects by a height H1, then the height H1 is substantially the same as a height H2 at which the right vent pipe 15 is properly attached.

When the first adjustment screws 11 or the second adjustment screws 12 are turned by a lateral screwdriver or the like, the reflector 4 is tilted through the sliders 21 and an intermediate plate 23 for vertical angular adjustment.

Figure 5:
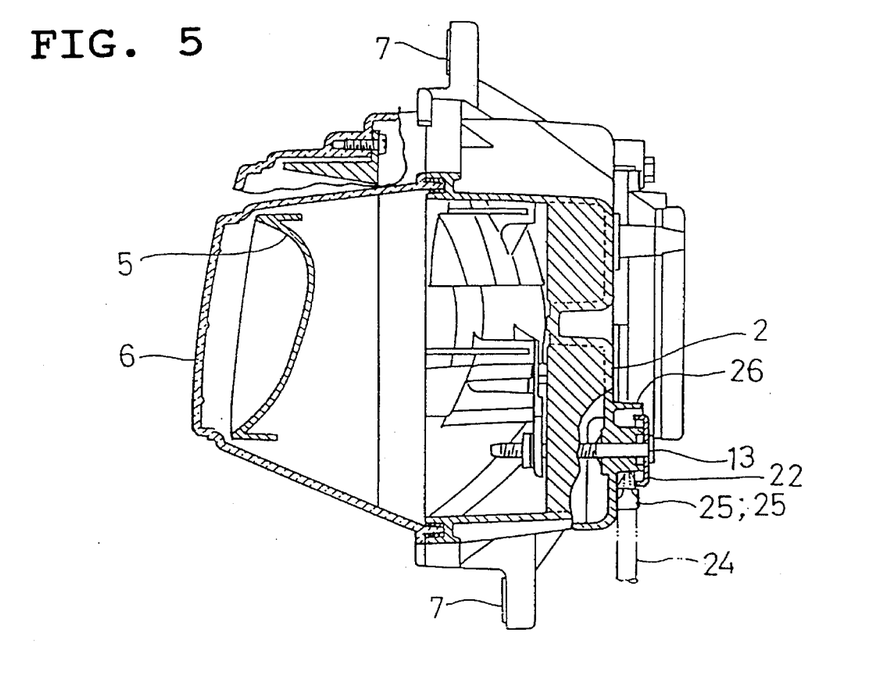
FIG. 5 is a cross-sectional view taken along line 5—5 of FIG. 2.

FIG. 5 is a cross-sectional view taken along line 5—5 of FIG. 2. A crown gear 22 is mounted on the proximal end of the third adjustment screw 13. When a screwdriver 24 for cross-slotted screw heads is inserted upwardly and turns the crown gear 22, the third adjustment screw 13 can be turned. A pair of relatively low left and right tool guide ribs 25 project from the housing 2 below the third adjustment screw 13. The screwdriver may be inserted between the tool guide ribs 25. A rib 26 projects from the housing 2 in surrounding relationship to upper portions of the crown gears 22, see also FIG. 2.

Figure 6:
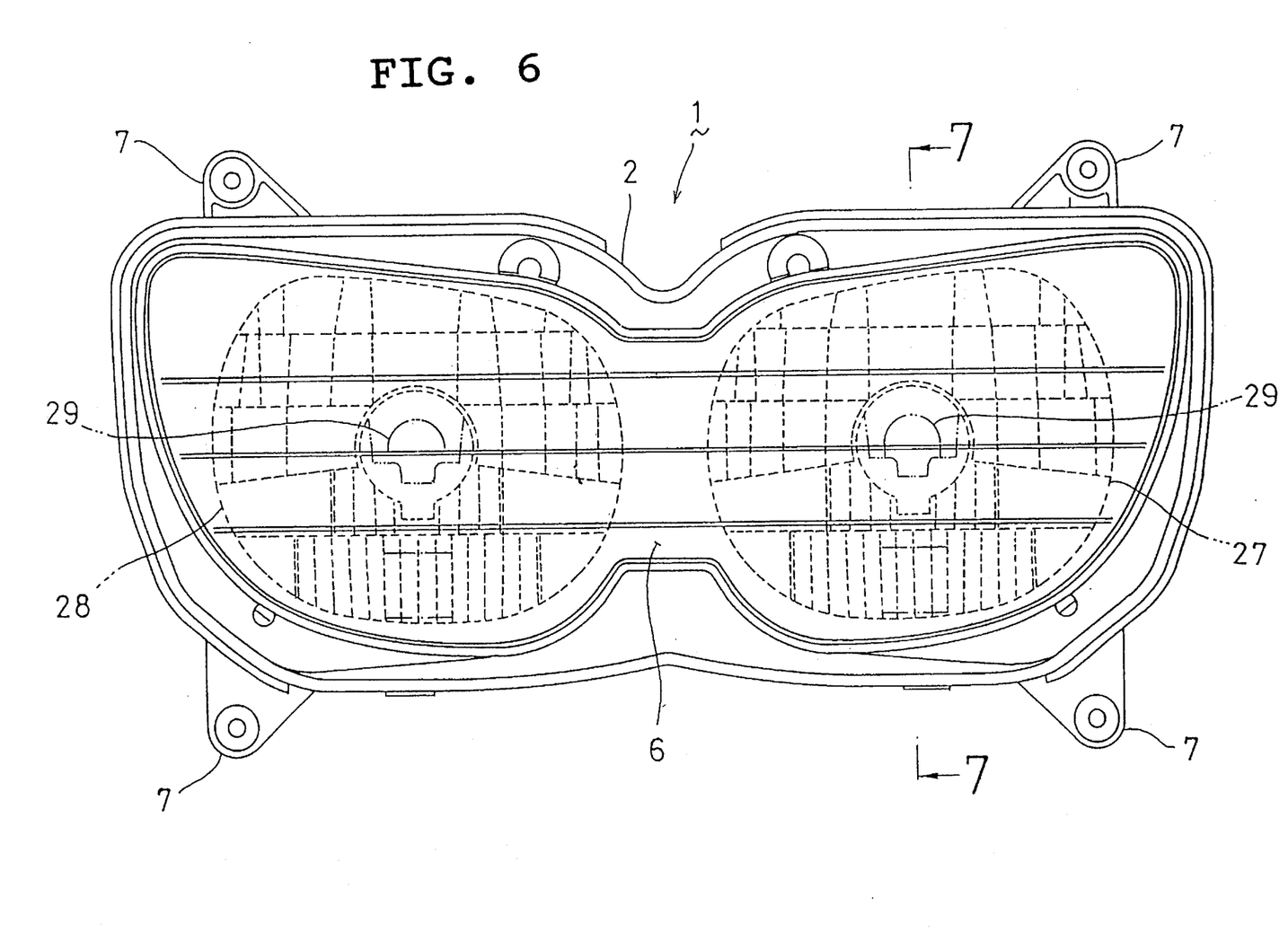
FIG. 6 is a view showing another embodiment of the structure shown in FIG. 1.

FIG. 6 is a view showing another embodiment of the structure shown in FIG. 1. First and second reflectors 27, 28 are in axial symmetry, and have identical Fresnel surface irregularity patterns on their reflecting surfaces. The reflectors 27, 28 do not have inner lenses described above with reference to FIG. 3. Subreflectors 29 are combined with bulbs 8. The subreflectors 29 serve to reverse light directed directly forwardly so as to concentrate on the reflector 27, thus increasing the intensity of light.

The other details are identical to those shown in FIG. 1, and identified by identical reference numerals, and will not be described in detail below.

Figure 7:
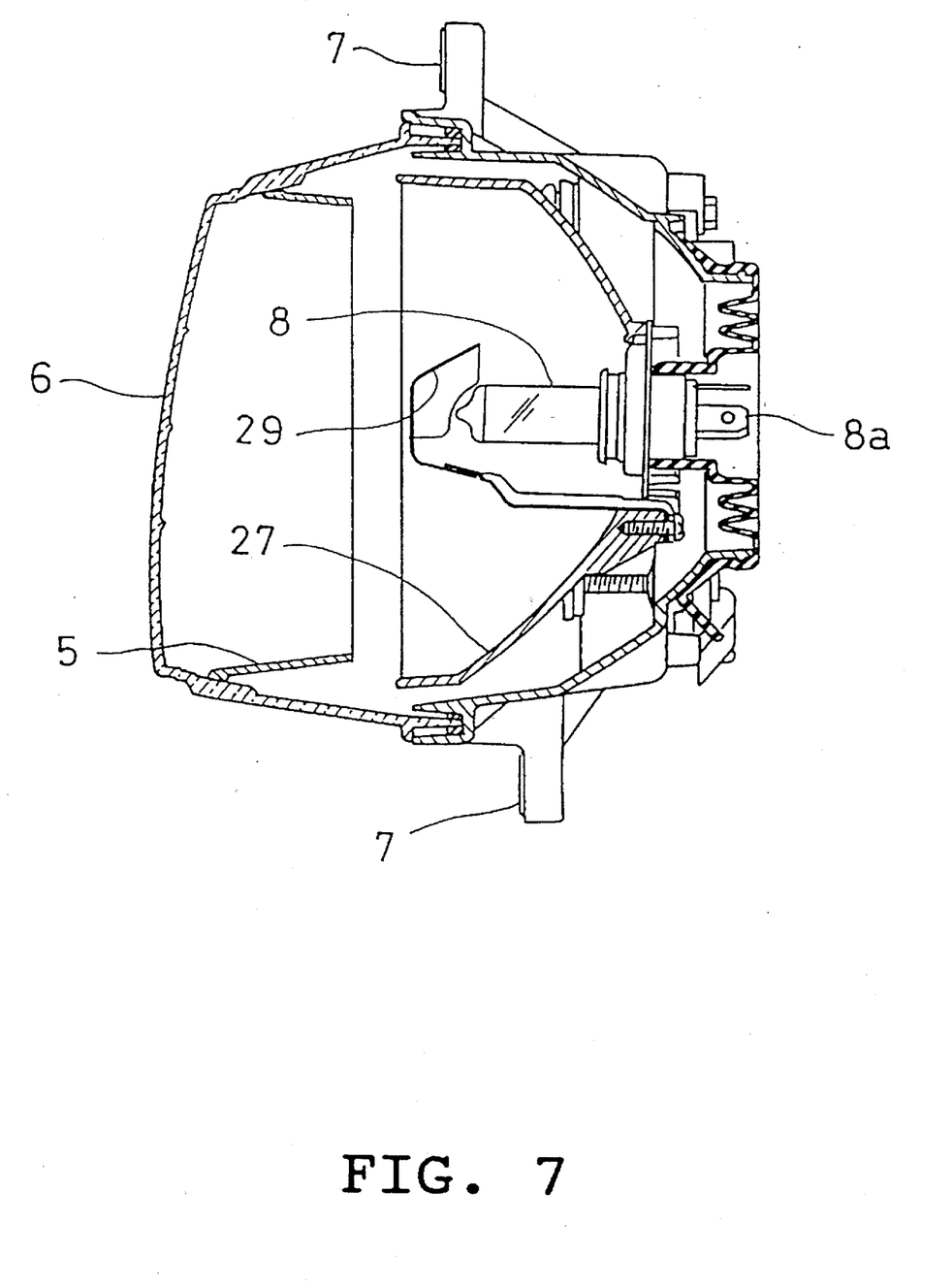
FIG. 7 is a cross-sectional view taken along line 7—7 of FIG. 6.

FIG. 7 is a cross-sectional view taken along line 7—7 of FIG. 6. The first bulb 8 is mounted centrally on the first reflector 27. Light emitted from the first bulb 8 is reflected by the first reflector 27, adjusted in its profile by the intermediate tube 5, and emitted through the lens 6. The second reflector 28 operates in the same manner as described above.

Figure 8:
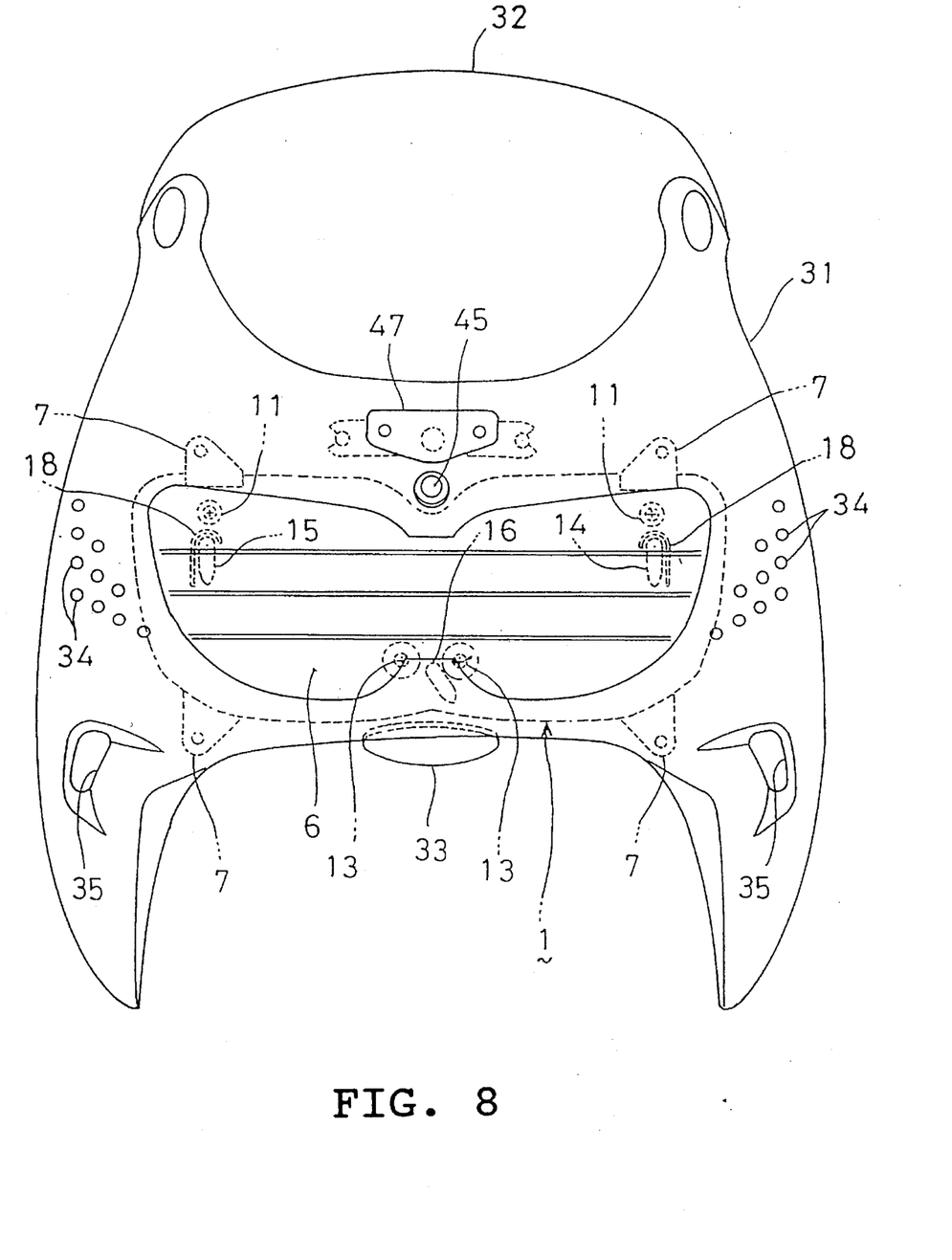
FIG. 8 is a fragmentary front elevational view of a motorcycle which is equipped with the head lamp device according to the present invention.

A motor vehicle, such a motorcycle, with the head lamp device 1 of the above construction will be described below. FIG. 8 is a fragmentary front elevational view of a motorcycle which is equipped with the head lamp device according to the present invention. The head lamp device 1 is fitted substantially centrally in a front cowl 31. First and third adjustment screws 11, 13 are provided together with vent pipes 14, 15, 16, and guard ribs 18.

A screen 32 is mounted on an upper portion of the front cowl 31, and a horn 33 is mounted on a lower portion of the front cowl 31. The front cowl 31 has small holes 34 and air inlet holes 35 which are defined in each of the left and right portions thereof.

The small holes 34 are defined to reduce air resistance caused by ram air which is laterally applied when the motorcycle is making a turn. Since the air resistance is reduced by the small holes 34, the motorcycle can be stably maneuvered.

The air inlet holes 35 serve as openings for introducing air into a head pipe and an air cleaner.

Figure 9:
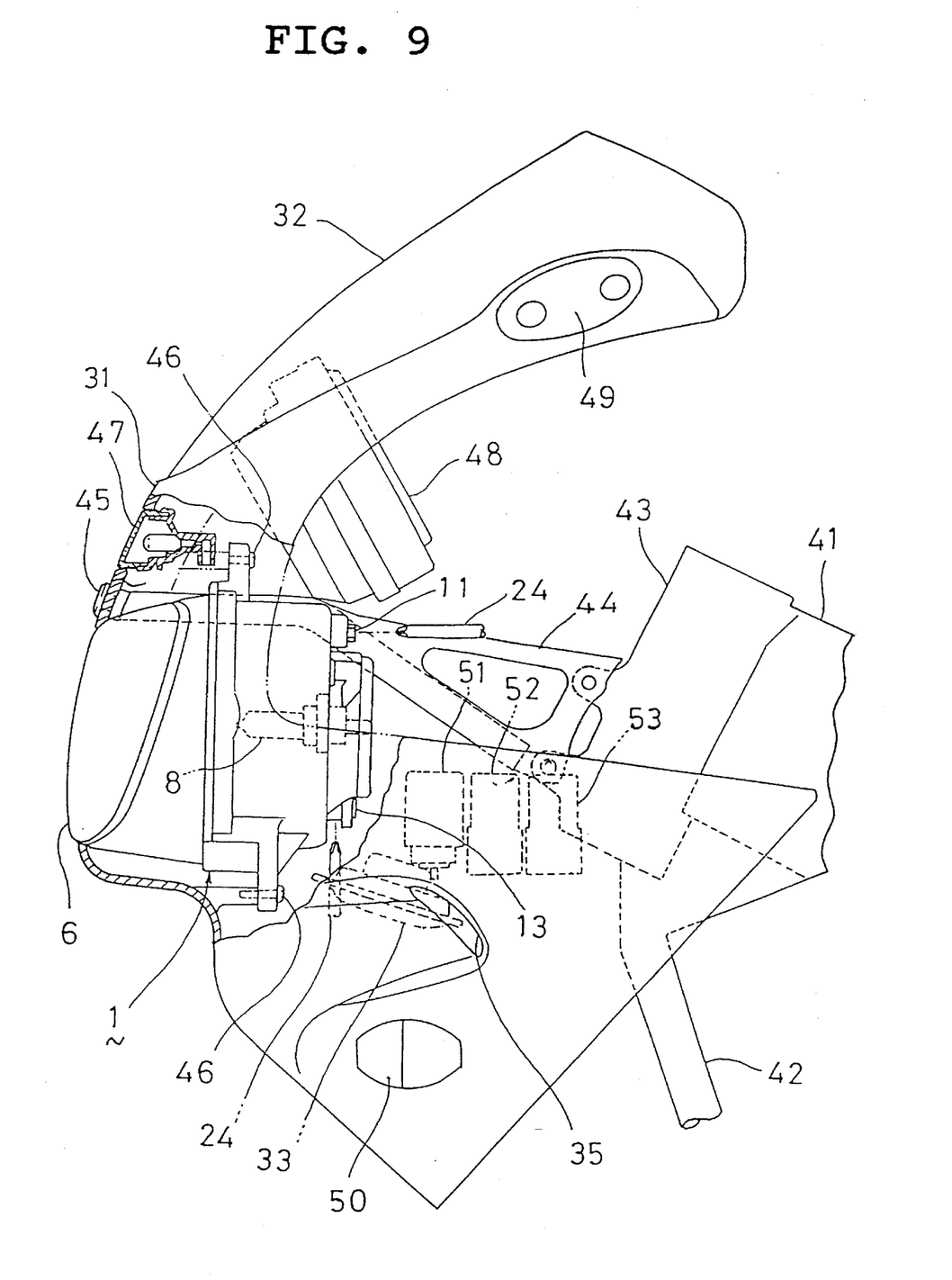
FIG. 9 is a fragmentary side elevational view of the motorcycle with the head lamp device according to the present invention.

FIG. 9 is a fragmentary side elevational view of the motorcycle with the head lamp device according to the present invention. A triangular front cowl stay 44 is fastened by bolts to a head pipe 43 which is fixed to front portions of a main frame 41 and an engine hanger frame 42. The front cowl 31 is secured to a front end of the triangular front cowl stay 44 by screws 45. The head lamp device 1 is fixed to the front cowl 31 by screws 46.

A position lamp 47 is attached to the front cowl 31. A meter 48 is mounted on a front upper portion of the front cowl stay 44. The front cowl 31 has rearview mirror attachment seats 49 and flashing indicator attachment seats 50.

Figure 10:
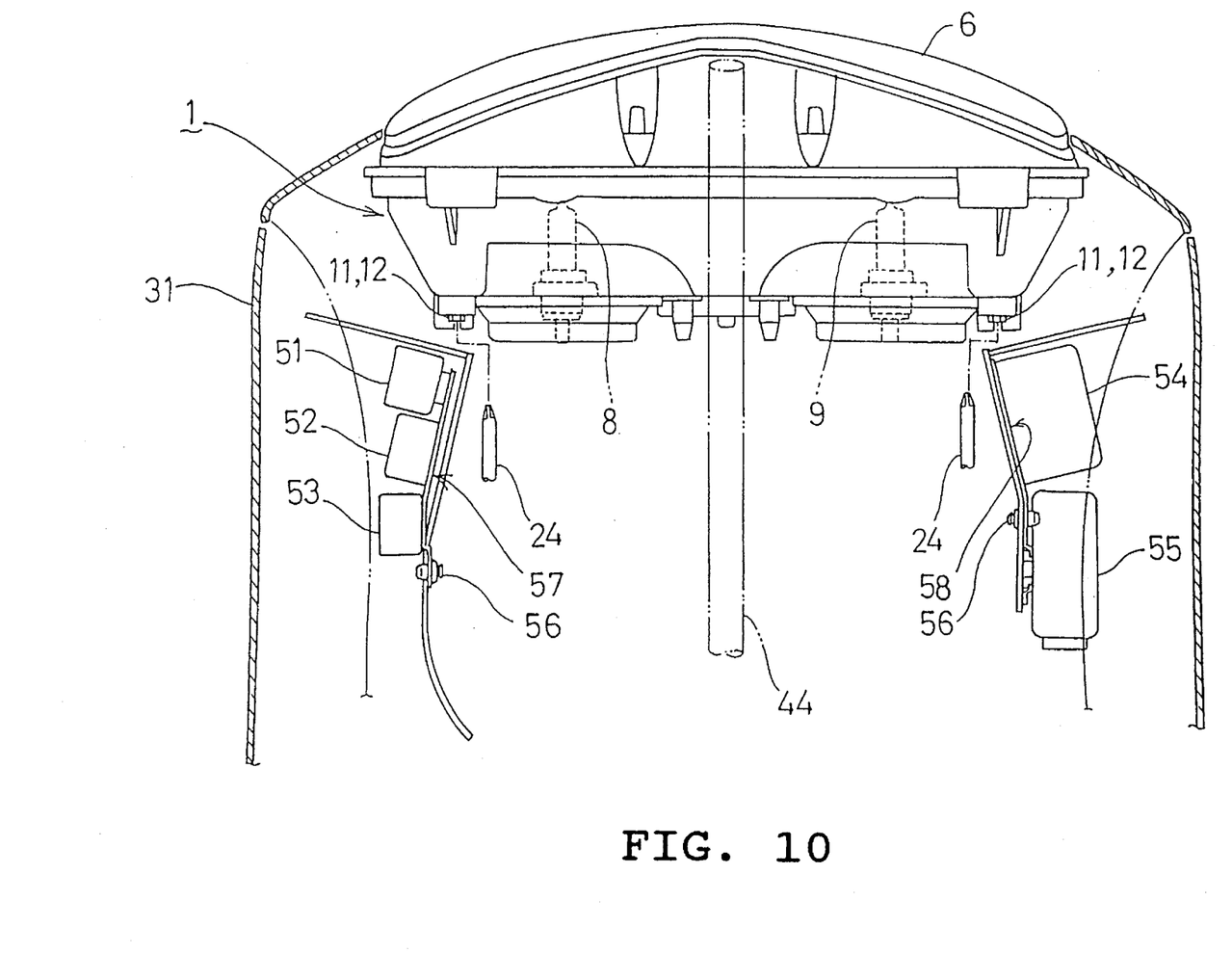
FIG. 10 is a fragmentary plan view of the motorcycle with the head lamp device according to the present invention.

FIG. 10 is a fragmentary plan view of the motorcycle with the head lamp device according to the present invention. A left stay 57 is secured by a clip 56 to an inner surface of the cowl 31 on the left-hand side of the front cowl stay 44 as viewed by the driver of the motorcycle. To the left stay 57, there are successively attached a flashing indicator relay 51, a head lamp high position relay 52, and a head lamp low position relay 53. A right stay 58 is secured by a clip 56 to an inner surface of the cowl 31 on the right-hand side of the front cowl stay 44. A coupler cluster plate 54 and a fuse box 55 are successively mounted on the right stay 58.

An aiming process carried out by the aiming mechanism on the motorcycle will be described below. The aiming mechanism is composed of the first through third adjustment screws 11, 13 and the sliders 21.

To adjust the optical axis vertically, the first and second adjustment screws 11, 12 may be turned to the left or right with the screwdriver 24 for cross-slotted screw heads in FIG. 10.

To adjust the optical axis horizontally, the first and third adjustment screws 11, 13 may be turned to the left or right with the screwdriver 24 for cross-slotted screw heads in FIG. 9.

Since electronic and electric components such as various relays are arranged closely and wires connected thereto extend in the vicinity of the aiming mechanism, the aiming process, specifically, the manipulation of the screwdriver 24, is not easy to perform.

According to the present invention, as shown in FIG. 2, the guard ribs 18 are provided to prevent the vent pipes 14, 15 from being damaged by the screwdriver 24 when the first adjustment screws 11 disposed immediately in the vicinity of the vent pipes 14, 15 are turned by the screwdriver 24. Even if the screwdriver 24 is disengaged from the first adjustment screws 11 when these screws are tightened, the screwdriver 24 only hits the guard ribs 18, and does not reach the vent pipes 14, 15.

No guard ribs are disposed near the second adjustment screws 12 as no vent pipes are present closely thereto. The central vent pipe 16 is present closely to the third adjustment screws 13. However, since the screwdriver 24 is vertically manipulated and guided by the pair of tool guide ribs 25 as described above with reference to FIG. 5, there is no risk of damage to the central vent pipe 16.

Furthermore, as shown in FIG. 4, the height H1 by which the guard rib 18 projects is substantially the same as the height H2 at which the vent pipe 15 is attached.

Accordingly, whether the vent pipe 15 is properly fitted over the boss 2b or not can easily be confirmed by checking the height H2. This also holds true for the vent pipe 14.

The above embodiment is discussed with respect to a motorcycle. However, the head lamp device 1 according to the present invention may be installed on a three-wheeled or four-wheeled motor vehicle.

With the present invention, as described above, an aiming mechanism for adjusting the optical axis is disposed near a vent pipe, and a guard rib separating the aiming mechanism and the vent pipe from each other projects from a housing. Consequently, while the head lamp is being aimed, the vent pipe is prevented from being damaged or dismounted by a tool such as a screwdriver. As a result, the adjustment screws used may be very short, allowing the space behind the head lamp device to be effectively utilized.

In the case where the reflector has a plurality of types of reflector surfaces, the lens for use with the reflector may be substantially transparent. The substantially transparent lens has a good appearance and does not need any lens cuts.

In the case where the height of the guard rib is substantially the same as the height at which the vent pipe is attached, a tool such as a screwdriver used for aiming is less liable to hit the vent pipe.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A head lamp device for a motor vehicle comprising:
    a housing for accommodating a bulb and a reflector;
    at least one vent hole defined in said housing venting vapors disposed within said housing;
    at least one vent pipe operatively connected to said vent hole;
    an aiming mechanism for adjusting an optical axis of said reflector being operatively mounted adjacent to said vent pipe; and
    a guard rib projecting from the housing separating the aiming mechanism and the vent pipe from each other to prevent contact of said vent pipe during manual adjustment of said aiming mechanism.

2. The head lamp device for a motor vehicle according to claim 1, wherein said reflector has a plurality of reflector surfaces having a plurality of types of reflecting angles, and a substantially transparent lens being disposed in front of the reflector.

3. The head lamp device for a motor vehicle according to claim 1, wherein said guard rib projects from said housing substantially the same distance as said vent pipe.

4. The head lamp device for a motor vehicle according to claim 1, wherein said aiming mechanism includes a plurality of adjustment screws operatively connected to said housing and said reflector for enabling manual adjustment of said reflector relative to said housing.

5. The head lamp device for a motor vehicle according to claim 1, wherein a plurality of vent holes defined in said housing and vent pipes connected to said vent holes are operatively provided for venting vapors disposed within said housing.

6. The head lamp device for a motor vehicle according to claim 1, wherein said guard rib and said vent pipe are disposed on an exterior surface of said housing and project a greater predetermined distance therefrom relative to a distance said aiming mechanism extends from said housing to prevent accidental engagement of said vent pipe during manual adjustment of said aiming mechanism.

7. The head lamp device for a motor vehicle according to claim 4, and further including a crown gear operatively connected to at least one of said adjustment screws for permitting manual adjustment of said adjustment screw at an angle relative thereto.

8. A vent mechanism for an adjustable head lamp assembly comprising:
    a housing for accommodating a bulb and a reflector;
    at least one vent pipe operatively connected to at least one aperture in said housing venting vapors disposed within said housing;
    an aiming mechanism for adjusting an optical axis of said reflector relative to said housing, said aiming mechanism being operatively mounted adjacent to said vent pipe; and
    a guard rib projecting from the housing separating the aiming mechanism and the vent pipe from each other to prevent contact of said vent pipe during manual adjustment of said aiming mechanism.

9. The vent mechanism for an adjustable head lamp assembly according to claim 8, wherein said reflector has a plurality of reflector surfaces having a plurality of types of reflecting angles, and a substantially transparent lens being disposed in front of the reflector.

10. The vent mechanism for an adjustable head lamp assembly according to claim 8, wherein said guard rib projects from said housing substantially the same distance as said vent pipe.

11. The vent mechanism for an adjustable head lamp assembly according to claim 8, wherein said aiming mechanism includes a plurality of adjustment screws operatively connected to said housing and said reflector for enabling manual adjustment of said reflector relative to said housing.

12. The head lamp vent mechanism for an adjustable head lamp assembly according to claim 11, and further including a crown gear operatively connected to at least one of said adjustment screws for permitting manual adjustment of said adjustment screw at an angle relative thereto.

13. The vent mechanism for an adjustable head lamp assembly according to claim 8, wherein a plurality of apertures in said housing and vent pipes connected to said apertures are operatively provided for venting vapors disposed within said housing.

14. The vent mechanism for an adjustable head lamp assembly according to claim 8, wherein said guard rib and said vent pipe are disposed on an exterior surface of said housing and project a greater predetermined distance therefrom relative to a distance said aiming mechanism extends from said housing to prevent accidental engagement of said vent pipe during manual adjustment of said aiming mechanism.

15. A head lamp vent mechanism for an adjustable head lamp assembly for a motorcycle comprising:
  a housing for accommodating a bulb and a reflector, said housing being elongated to be accommodated within a front surface of a cowl of a motorcycle;
  at least one vent pipe operatively connected to at least one aperture in a rear surface of said housing venting vapors disposed within said housing;
  an aiming mechanism for adjusting an optical axis of said reflector relative to said housing, said aiming mechanism being operatively mounted adjacent to said vent pipe; and
  a guard rib projecting from the housing separating the aiming mechanism and the vent pipe from each other to prevent contact of said vent pipe during manual adjustment of said aiming mechanism.

16. The head lamp vent mechanism for an adjustable head lamp assembly for a motorcycle according to claim 15, wherein said reflector has a plurality of reflector surfaces having a plurality of types of reflecting angles, and a substantially transparent lens being disposed in front of the reflector.

17. The head lamp vent mechanism for an adjustable head lamp assembly for a motorcycle according to claim 15, wherein said guard rib projects from said housing substantially the same distance as said vent pipe.

18. The head lamp vent mechanism for an adjustable head lamp assembly for a motorcycle according to claim 15, wherein said aiming mechanism includes a plurality of adjustment screws operatively connected to said housing and said reflector for enabling manual adjustment of said reflector relative to said housing.

19. The head lamp vent mechanism for an adjustable head lamp assembly for a motorcycle according to claim 15, wherein said guard rib and said vent pipe are disposed on an exterior surface of said housing and project a greater predetermined distance therefrom relative to a distance said aiming mechanism extends from said housing to prevent accidental engagement of said vent pipe during manual adjustment of said aiming mechanism.

20. The head lamp vent mechanism for an adjustable head lamp assembly for a motorcycle according to claim 15, wherein a plurality of apertures in said housing and vent pipes connected to said apertures are operatively provided for venting vapors disposed within said housing.

21. The head lamp vent mechanism for an adjustable head lamp assembly for a motorcycle according to claim 18, and further including a crown gear operatively connected to at least one of said adjustment screws for permitting manual adjustment of said adjustment screw at an angle relative thereto.

\* \* \* \* \*